(12) United States Patent
Pan

(10) Patent No.: US 11,882,928 B2
(45) Date of Patent: Jan. 30, 2024

(54) DESKTOP SCREEN BRACKET

(71) Applicant: Beijing Huaqing Technology Co., Ltd, Beijing (CN)

(72) Inventor: Zhenguo Pan, Beijing (CN)

(73) Assignee: Beijing Huaqing Technology Co., Ltd, Beijing (CN)

( * ) Notice: Subject to any disclaimer, the term of this patent is extended or adjusted under 35 U.S.C. 154(b) by 0 days.

(21) Appl. No.: 17/875,556

(22) Filed: Jul. 28, 2022

(65) Prior Publication Data
US 2023/0225504 A1  Jul. 20, 2023

(30) Foreign Application Priority Data

Jan. 20, 2022 (CN) .......................... 202220160094.9
Apr. 20, 2022 (CN) .......................... 202220969017.8

(51) Int. Cl.
*A47B 21/04* (2006.01)
*F16M 11/04* (2006.01)

(52) U.S. Cl.
CPC ........... *A47B 21/04* (2013.01); *F16M 11/045* (2013.01); *F16M 11/046* (2013.01)

(58) Field of Classification Search
CPC .... F16M 11/046; F16M 11/045; A47B 21/04; A47B 2083/003; A47B 2021/066; A47B 2021/064

USPC ................... 248/917–923; 312/223.3, 223.1; 439/535, 569
See application file for complete search history.

(56) References Cited

U.S. PATENT DOCUMENTS

| | | | | |
|---|---|---|---|---|
| 7,261,261 B2* | 8/2007 | Ligertwood | ........... | F16M 11/42 248/129 |
| 8,167,253 B2* | 5/2012 | Smith | ........... | A47B 81/06 108/93 |
| 9,148,977 B1* | 9/2015 | Williams | ........... | A47B 47/021 |
| 2004/0188573 A1* | 9/2004 | Weatherly | ........... | F16M 11/42 248/917 |
| 2009/0039212 A1* | 2/2009 | Whalen | ........... | A47B 81/065 248/158 |
| 2009/0057501 A1* | 3/2009 | Huang | ........... | F16M 11/22 248/157 |

* cited by examiner

*Primary Examiner* — Christopher Garft

(57) ABSTRACT

The present invention is concerned with a desktop screen bracket, comprising a screen bracket main body, a support rod and a support base, the support rod is arranged on the support base, an extension socket installation slot for installing an extension socket is arranged on the support rod, and a threading opening is arranged on the extension socket installation slot, a power cord of the extension socket is connected to the outside world through the threading opening. The advantageous effects of the present invention are as follows: solving the problem of random arrangement of the extension socket that supplies power to the screen and high potential safety hazards, and improving the cleanliness and appearance of the desktop by arranging extension socket installation slots on a support rod.

5 Claims, 5 Drawing Sheets

DESKTOP SCREEN BRACKET

CROSS REFERENCE TO RELATED APPLICATION

This application claims priority benefit of Chinese Utility Model. Application No. 202220969017.8, filed on Apr. 20, 2022, No. 202220160094.9, filed on Jan. 20, 2022, and the entire contents of which are incorporated herein by reference.

TECHNICAL FIELD OF THE INVENTION

The present invention relates to a screen bracket, particularly to a desktop screen bracket.

BACKGROUND OF THE INVENTION

The desktop screen bracket is a screen peripheral device specially developed for flat-panel TVs, LCD TVs, computer monitors and other equipment. It is suitable for family living rooms, bedrooms, offices, conference halls, exhibition halls, hotels, airports, railway stations, hospitals, bus stops, shopping plazas and other places, and is placed on the desktop to support the screen. However, there is a high demand for electricity around the desktop screen bracket, and the required extension socket has nowhere to be placed, and can only be placed on the desktop. There is no good way to store them, so they are easily affected by the outside world, and have potential safety hazards, and are inconvenient to use, and affect the appearance of the desktop.

SUMMARY OF THE INVENTION

The present invention aims to provide a desktop screen bracket, which solves the problem of random arrangement of the extension socket that supplies power to the screen and high potential safety hazards, and can also improve the cleanliness and appearance of the desktop by arranging extension socket installation slots on a support rod.

In order to achieve the above-mentioned aims of the invention, the present invention provides the following technical solutions:

a desktop screen bracket, comprising a screen bracket main body, a support rod, a support base and an extension socket, the support rod is arranged on the support base, an extension socket installation slot for installing an extension socket is arranged on the support rod, and a threading opening is arranged on the extension socket installation slot, a power cord of the extension socket is connected to the outside world through the threading opening.

Preferably, a connecting part is arranged around the extension socket installation slot and the connecting part is arranged on the outer surface of the support rod, and an extension plate is arranged on the extension socket. When the extension socket is inserted in the extension socket installation slot, the extension plate is installed on the connecting part. So the extension plate can avoid the problem that the extension socket cannot be pulled out because it is all embedded in the extension socket installation slot, and can improve the user experience.

Preferably, a mounting orifice is arranged on the connecting part, and a fixing orifice is arranged on the extension plate. When the extension socket is inserted in the extension socket installation slot, the fixing orifice and the mounting orifice are aligned and fixed by screw cooperation. The extension socket is fixed on the extension socket installation slot by screw cooperation, which can ensure that the extension socket is firmly fixed and not easy to fall off.

Preferably, an atmosphere lamp is arranged on the screen bracket main body, and the atmosphere lamp can be turned on when the screen is used in a dark place, so as to reduce the brightness difference between the screen and the outside world and protect the eyes of the user, and the atmosphere lamp can emit lights of different colors according to the colors displayed on the screen, so as to fit the screen effect and improve the use experience of the screen.

Preferably, the screen bracket main body comprises a back plate and hanging arms, the hanging arms are arranged on both sides of the back plate, the back plate is used to support the hanging arms on both sides, and the hanging arms can be used to install the screen to ensure that the screen is securely installed.

Preferably, a plurality of assembly orifices are arranged on each the hanging arm along the height direction, and the screen can be selectively assembled on the assembly orifices of different heights, so as to achieve the purpose of adjusting the mounting height.

Preferably, a hook is arranged on a hanging arm, and a laterally elongated snap connection part is arranged on the back plate, the hook is hung on any position of the snap connection part, so the hanging arms can be simply installed on the back plate, and as long as the installation position of the hook is adjusted, the width between the two hanging arms can be adjusted, which can adapt to screens of different widths.

Compared with the prior art, the advantageous effects of the present invention are as follows:

in the present invention, an extension socket installation slot is arranged on the support rod, the extension socket is arranged in the extension socket installation slot, so the extension socket does not need to be placed on the table or other positions on the ground; because the extension socket is used to supply power to the electrical device, it may cause potential safety hazards if the extension socket is placed arbitrarily, and it is extremely dangerous whether the user's water is poured into the extension socket or his hand accidentally touches the jacks of the extension socket; in the present invention, the extension socket can be stored in the extension socket installation slot, so on the one hand, the desktop looks uncluttered and beautiful and generous, and on the other hand, the safety guarantees can be obtained, accidents are not easy to occur, and the use is convenient;

moreover, in the present invention, a threading opening is arranged on the extension socket installation slot, and the extension socket generally needs a thicker power cord to connect the live wire, neutral wire and ground wire of the extension socket with the indoor socket, so as to ensure that the extension socket is energized and is safe; the threading opening can provide a place for the power cord to pass through, when in use the power cord can be connected to the outside world without being bent, and it will not be damaged due to bending and cause electric leakage, which can improve the safety of the extension socket and the service life of the power cord.

Therefore, the present invention provides a desktop screen bracket, which solves the problem of random arrangement of the extension socket that supplies power to the screen and high potential safety hazards, and can also improve the cleanliness and appearance of the desktop by arranging an extension socket installation slots on a support rod.

DETAILED DESCRIPTION OF THE PREFERRED EMBODIMENT

The technical solutions in the embodiments of the present invention will be explicitly and completely described below in conjunction with the accompanying drawings in the embodiments of the present invention. Apparently, the described embodiments are only some of the embodiments of the present invention, rather than all of the embodiments. Based on the embodiments of the present invention, all the other embodiments obtained by those of ordinary skill in the art without inventive efforts shall fall within the protection scope of the present invention.

It is to be noted that, all the directional indications (such as up, down, left, right, front, rear . . . ) in the embodiments of the present invention are only used to explain the relative positional relationships and motion conditions between various members in a particular attitude (as shown in the accompanying drawings). If the particular attitude changes, the directional indication also changes accordingly.

In addition, descriptions such as "first" and "second" in the present invention are only intended for illustrative purposes, but cannot be construed as indicating or implying their relative importance or implicitly indicating the number of the technical features as indicated. Thus, the features defined with "first" and "second" may explicitly or implicitly include at least one of the features, next, in the description of the present invention, "a plurality of" means at least two, such as two or three, unless otherwise expressly and specifically limited.

In the present invention, unless otherwise expressly specified and defined, the terms such as "connected" and "fixed" should be understood in a broad sense, for example, "fixed" may be a fixed connection, a detachable connection, or an integral formation; may be a mechanical connection or an electrical connection; may be a direct connection or an indirect connection through an intermediate medium, and may be an internal communication between two elements or an interaction relationship between two elements, unless otherwise specifically defined. For those of ordinary skill in the art, the specific meanings of the above-described terms in the present invention may be understood according to specific conditions.

In addition, the technical solutions among various embodiments of the present invention may be combined with each other, but has to be based on a possible implementation by those of ordinary skill in the art. When the combination of technical solutions involves mutual contradiction or cannot be implemented, it should be considered that such combination of technical solutions neither is present nor falls within the protection scope claimed by the present invention.

Figure 1:
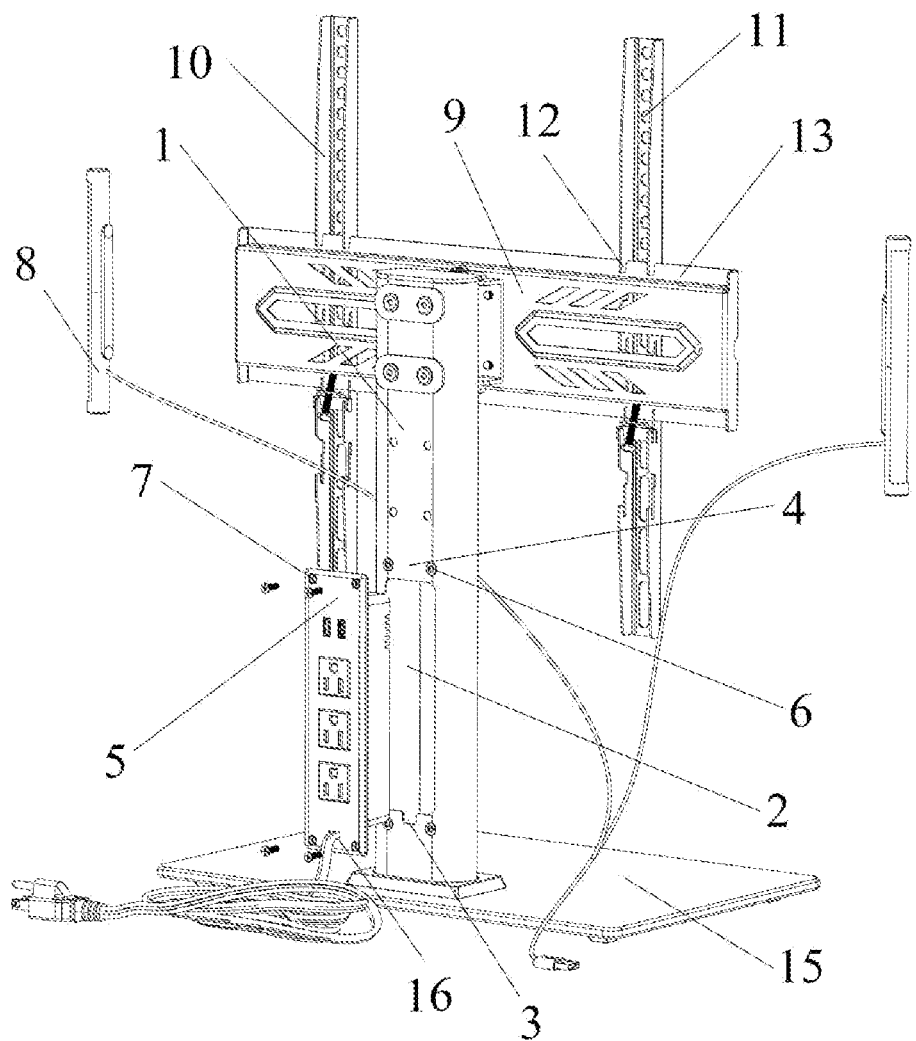
FIG. 1 is an, exploded schematic structural view of the present invention.
Figure 2:
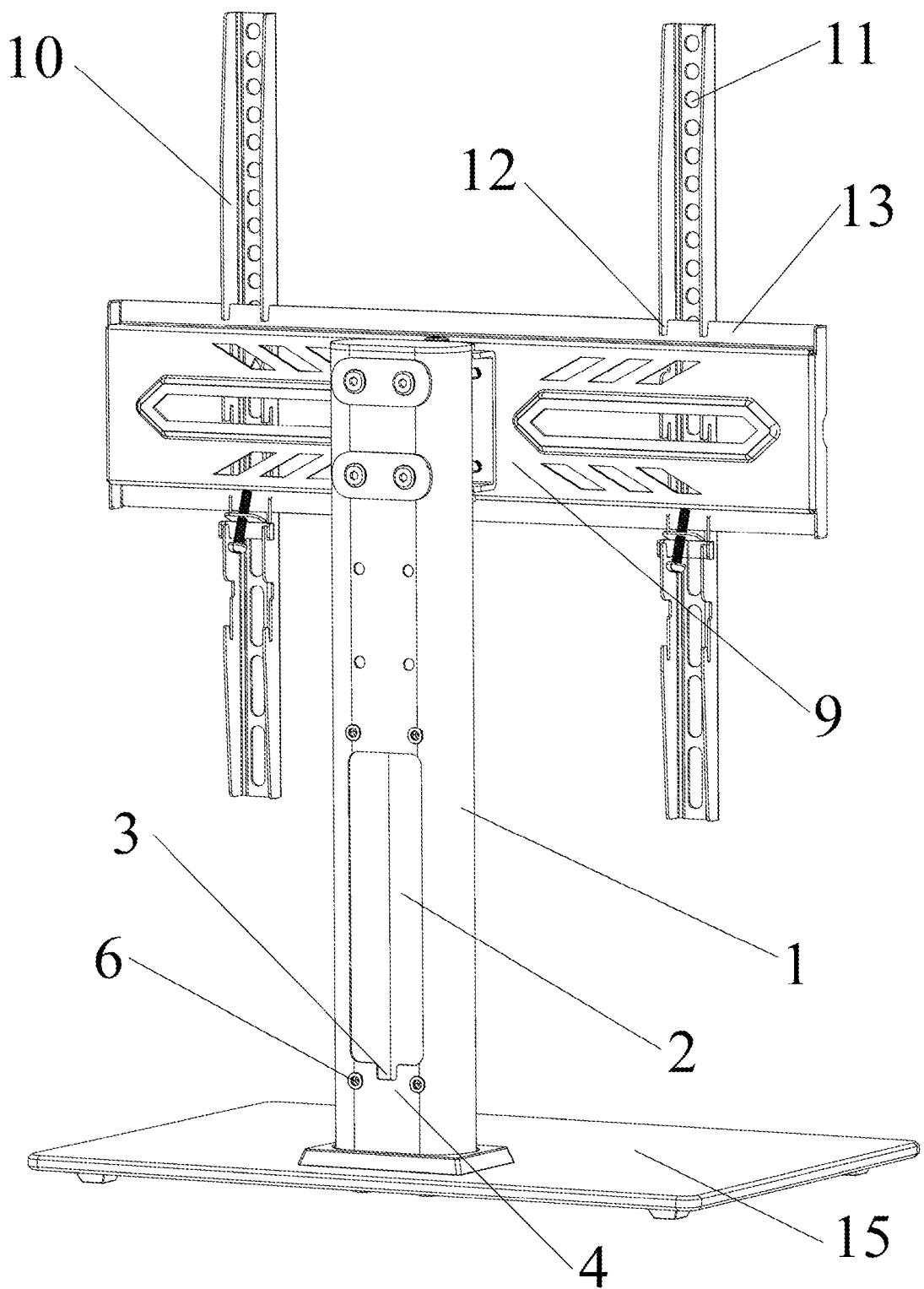
FIG. 2 is an overall schematic structural view of the present invention without an extension socket installed.
Figure 3:
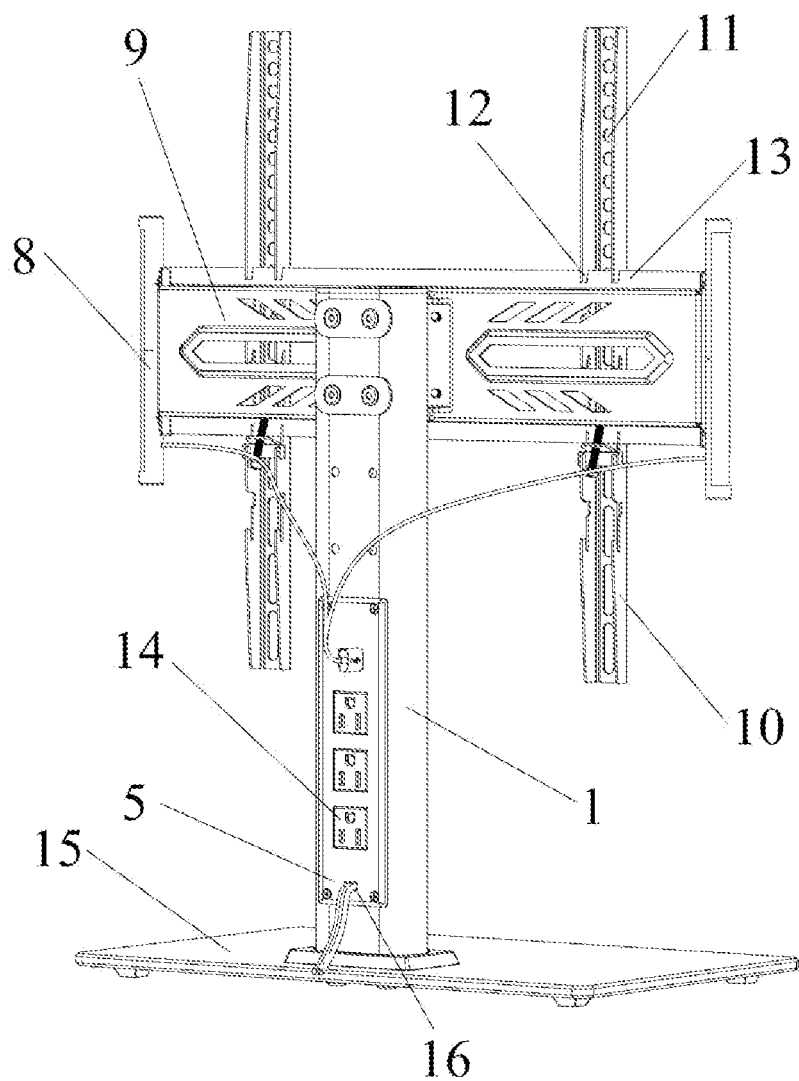
FIG. 3 is a schematic structural view of the assembly of the extension socket according to the present invention.
Figure 4:
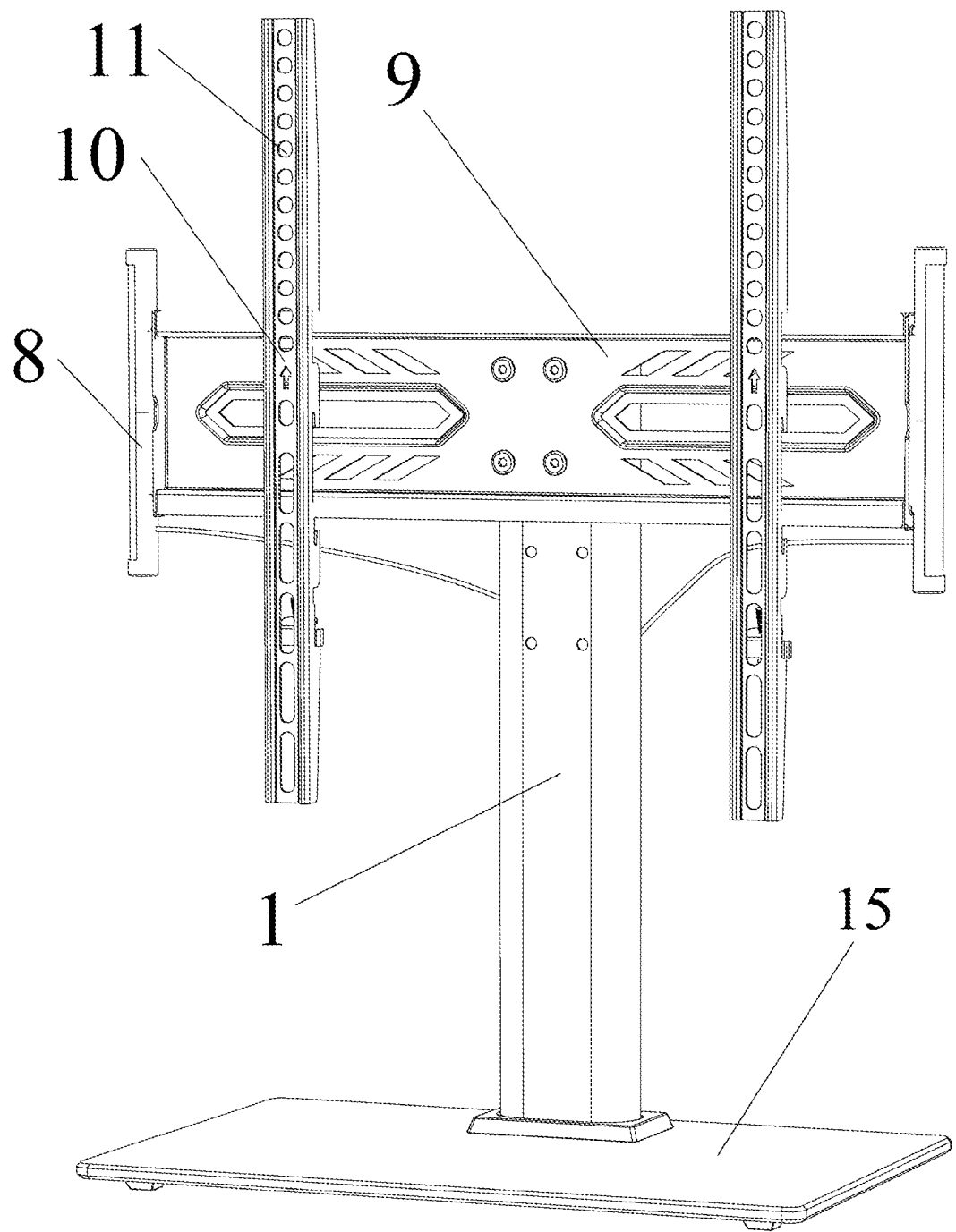
FIG. 4 is an overall schematic structural view of the present invention.
Figure 5:
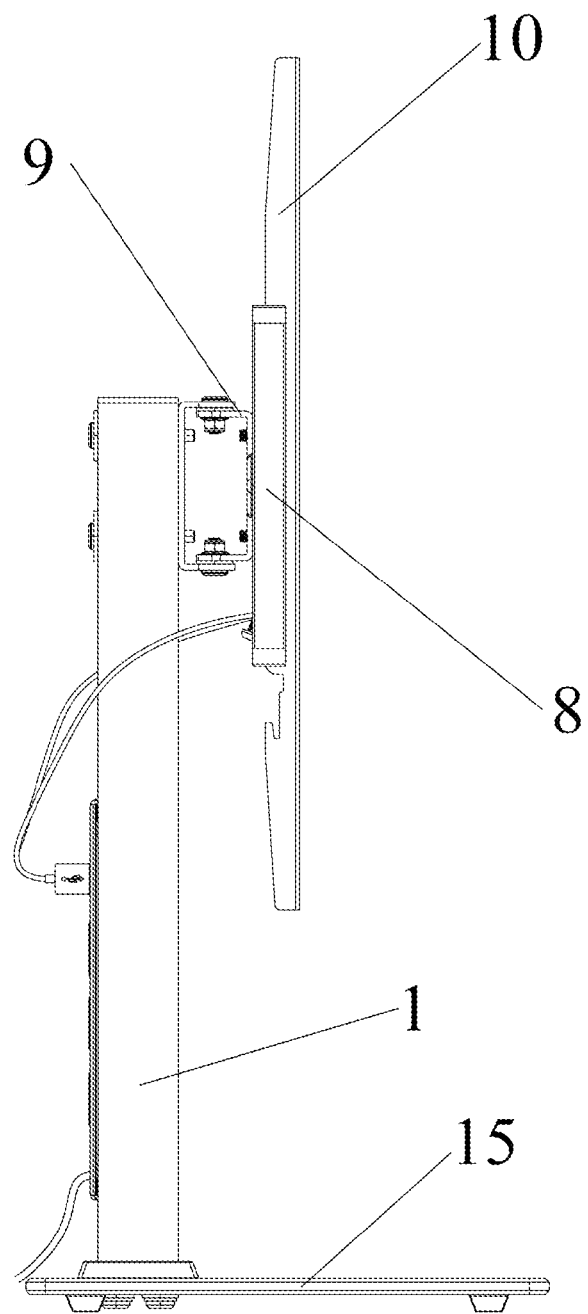
FIG. 5 is a side schematic structural view of the present invention.

Please refer to FIG. 1-FIG. 5, FIG. 1 is an exploded schematic structural view of the present invention; FIG. 2 is an overall schematic structural view of the present invention without an extension socket installed; FIG. 3 is a schematic structural view of the assembly of the extension socket according to the present invention; FIG. 4 is an overall schematic structural view of the present invention; FIG. 5 is a side schematic structural view of the present invention.

An embodiment of the present invention provides a desktop screen bracket. The names of the members corresponding to the reference signs in the figures are as follows: support rod 1, extension socket installation slot 2, threading opening 3, connecting part 4, extension plate 5, mounting orifice 6, fixing orifice 7, atmosphere lamp 8, back plate 9, hanging arm 10, assembly orifice 11, hook 12, snap connection part 13, extension socket 14, support base 15, threading hole 16.

A desktop screen bracket, comprising a screen bracket main body, a support rod 1, a support base 15 and an extension socket 14, the support rod 1 is mounted on the support base 15, and an extension socket installation slot 2 for installing the extension socket 14 is arranged on the support rod 1, an opening direction of the extension socket installation slot being away from a side of the support rod on which side a screen arranged,a threading opening 3 is arranged at a bottom of en-the extension socket installation slot 2, a threading hole 16 corresponding to the threading opening 3 arranged at a bottom of the extension socket 14, and the power cord of the extension socket 14 is connected to the outside world through the threading opening 3 and the threading hole 16.

A connecting part 4 is arranged around the extension socket installation slot 2 and is arranged on the outer surface of the support rod 1, and an extension plate 5 is arranged on the extension socket 14. When the extension socket 14 is inserted in the extension socket installation slot 2, the extension plate 5 is installed on the connecting part 4. So the extension plate 5 can avoid the problem that the extension socket 14 cannot be pulled out because it is all embedded in the extension socket installation slot 2, and can improve the user experience.

A mounting orifice 6 is arranged on the connecting part 4, and a fixing orifice 7 is arranged on the extension plate 5. When the extension socket 14 is inserted in the extension socket installation slot 2, the fixing orifice 7 and the mounting orifice 6 are aligned and fixed by screws. The extension socket 14 is fixed on the extension socket installation slot 2 by screw cooperation, which can ensure that the extension socket 14 is firmly fixed and not easy to fall off.

An atmosphere lamp 8 is arranged on the screen bracket main body, which can be turned on when the screen is used in a dark place, so as to reduce the brightness difference between the screen and the outside world and protect the eyes of the user, and the atmosphere lamp can emit lights of different colors according to the colors displayed on the screen, so as to fit the screen effect and improve the use experience of the screen.

The screen bracket main body comprises a back plate 9 and hanging arms 10. The hanging arms 10 are arranged on both sides of the back plate 9. The back plate 9 is used to support the hanging arms 10 on both sides. The hanging arms 10 can be used to install the screen to ensure that the screen is securely installed.

A plurality of assembly orifices 11 are arranged on each of the hanging arms 10 along the height direction, and the screen can be selectively assembled on the assembly orifices 11 of different heights, so as to achieve the purpose of adjusting the mounting height.

A hook 12 is arranged on the hanging arm 10, and a laterally elongated snap connection part 13 is arranged on the back plate 9, and the hook 12 is hung on any position of the snap connection part 13, so the hanging arms 10 can be simply installed on the back plate 9. Moreover, as long as the installation position of the hook 12 is adjusted, the width between the two hanging arms 10 can be adjusted, which can adapt to screens of different widths.

The using method and working method of the present invention are as follows:

arranging the support rod 1 on the support base 15, arranging the back plate 9 on the support rod 1, adjusting the position of the hook 12 and the snap connection part 13, hooking the hook 12 on the snap connection part 13, and installing the hanging arms 10 at both ends of the back plate 9, and mounting the screen on the hanging arms 10 through suitable assembly orifices 11, and arranging the atmosphere lamp 8 around the screen;

when the extension socket 14 needs to be installed, inserting the extension socket 14 into the extension socket installation slot 2, and overlapping the extension plate 5 of the extension socket 14 and the connecting part 4 around the extension socket installation slot 2 to ensure that the mounting orifice 6 and the fixing orifice 7 are aligned and fixed by screwing in with screw, the power cord of the extension socket 14 passes through the threading opening 3 to connect with the outside world, and the connection electric wire of the atmosphere lamp 8 is inserted into the extension socket 14, then the installation of the extension socket 14 is completed.

Compared with the prior art, the advantageous effects of the present invention are as follows:

in the present invention, an extension socket installation slot 2 is arranged on the support rod 1 the extension socket 14 is arranged in the extension socket installation slot 2, so the extension socket 14 does not need to be placed on the table or other positions on the ground; because the extension socket 14 is used to supply power to the electrical device, it may cause potential safety hazards if the extension socket 14 is placed arbitrarily, and it is extremely dangerous whether the user's water is poured into the extension socket 14 or his hand accidentally touches the jacks of the extension socket; in the present invention, the extension socket 14 can be stored in the extension socket installation slot 2, so on the one hand, the desktop looks uncluttered and beautiful and generous, and on the other hand, the safety guarantees can be obtained, accidents are not easy to occur, and the use is convenient;

moreover, in the present invention, a threading opening 3 is arranged on the extension socket installation slot 2, and the extension socket 14 generally needs a thicker power cord to connect the live wire, neutral wire and ground wire of the extension socket 14 with the indoor socket, so as to ensure that the extension socket 14 is energized and, is safe; the threading opening 3 can provide a place for the power cord to pass through, when in use the power cord can be connected to the outside world without being bent, and it will not be damaged due to bending and cause electric leakage, which can improve the safety of the extension socket 14 and the service life of the power cord.

Therefore, the present invention provides a desktop screen bracket, which solves the problem of random arrangement of the extension socket that supplies power to the screen and high potential safety hazards, and can also improve the cleanliness and appearance of the desktop by arranging an extension socket installation slot on a support rod.

The above are only the preferred embodiments of the present invention. It should be noted that the above preferred embodiments should not be regarded as limitations of the present invention, and the protection scope of the present invention should be based on the scope defined by the claims. For those skilled in the art, several improvements and modifications can be made without departing from the spirit and scope of the present invention, and these improvements and modifications should also be regarded as the protection scope of the present invention.

What is claimed is:

1. A desktop screen bracket, comprising a screen bracket main body, a support rod, a support base and an extension socket, the support rod being arranged on the support base, an extension socket installation slot for installing the extension socket being arranged on the support rod, an opening direction of the extension socket installation slot being away from a side of the support rod on which side a screen arranged, and a threading opening being arranged at a bottom of the extension socket installation slot, a threading hole corresponding to the threading opening arranged at a bottom of the extension socket, a power cord of the extension socket being connected to the outside world through the threading opening and the threading hole, a connecting part is arranged around the extension socket installation slot and the connecting part is a section on a back side of the support rod and is flush with a remaining section on the back side of the support rod, and an extension plate is arranged on the extension socket, when the extension socket is inserted in the extension socket installation slot, the extension plate is arranged on the connecting part, and a mounting orifice is arranged on the connecting part, and a fixing orifice is arranged on the extension plate, when the extension socket is inserted in the extension socket installation slot, the fixing orifice and the mounting orifice being aligned and fixed by screw cooperation.

2. A desktop screen bracket according to claim 1, wherein an atmosphere lamp is arranged on the screen bracket main body.

3. A desktop screen bracket according to claim 1, wherein the screen bracket main body comprises a back plate and hanging arms, and wherein the hanging arms are arranged on both sides of the back plate.

4. A desktop screen bracket according to claim 2, wherein a plurality of assembly orifices are arranged on each of the hanging arms along the height direction.

5. A desktop screen bracket according to claim 2, wherein a hook is arranged on each of the hanging arms, and a laterally elongated snap connection part is arranged on the back plate, and the hook is hung on any position of the snap connection part.

\* \* \* \* \*